United States Patent
Semba

(10) Patent No.: US 7,133,229 B2
(45) Date of Patent: Nov. 7, 2006

(54) MAGNETIC RECORDING DISK DRIVE WITH PATTERNED MEDIA AND COMPENSATION FOR WRITE-CLOCK TIMING ERROR CAUSED BY ROTATIONAL DISTURBANCES

(75) Inventor: Tetsuo Semba, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 36 days.

(21) Appl. No.: 11/056,965

(22) Filed: Feb. 10, 2005

(65) Prior Publication Data

US 2006/0176599 A1 Aug. 10, 2006

(51) Int. Cl.
*G11B 5/09* (2006.01)
(52) U.S. Cl. .................................................. 360/51
(58) Field of Classification Search .................. 360/51, 360/131, 39, 55, 75, 78.04; 369/53.3; 318/254; 331/34
See application file for complete search history.

(56) References Cited

U.S. PATENT DOCUMENTS

| | | | |
|---|---|---|---|
| 5,535,067 A | | 7/1996 | Rooke |
| 5,820,769 A | | 10/1998 | Chou |
| 6,229,402 B1 | * | 5/2001 | Kataoka et al. ............... 331/34 |
| 6,680,593 B1 | * | 1/2004 | Gotou ......................... 318/254 |
| 6,754,017 B1 | * | 6/2004 | Rettner et al. ................ 360/51 |
| 6,904,010 B1 | * | 6/2005 | Kuroba et al. ............. 369/53.3 |
| 2002/0121871 A1 | * | 9/2002 | Gotou ......................... 318/254 |
| 2003/0218823 A1 | | 11/2003 | Dang |
| 2004/0105184 A1 | * | 6/2004 | Harada et al. ................ 360/51 |
| 2004/0246617 A1 | | 12/2004 | Ehrlich |
| 2004/0257693 A1 | | 12/2004 | Ehrlich |
| 2006/0092541 A1 | * | 5/2006 | Moser ......................... 360/51 |

FOREIGN PATENT DOCUMENTS

JP 2003091940 3/2003

OTHER PUBLICATIONS

R. L. White et al., "Patterned Media: A Viable Route to 50 Gbit/in2 and Up for Magnetic Recording?", IEEE Transactions on Magnetics, vol. 33, No. 1, Jan. 1997, pp. 990-995.
Jinzenji et al., "Acceleration Feedforward Control Against Rotational Disturbance in hard Disk Drives", IEEE Transactions on Magnetics, vol. 37, No. 2, Mar. 2001, pp. 888-893.
D. Y. Abramovitch, "Rejecting Rotational Disturbances On Small Disk Drives Using Rotational Accelerometers", Proceedings of the 1996 IFAC World Congress in San Francisco, 199.
M. Albrecht et al., "Patterned Perpendicular and Longitudinal Media: A Magnetic Recording Study", IEEE Transactions On Magnetics, vol. 39, No. 5, Sep. 2003, pp. 2323-2325.

* cited by examiner

*Primary Examiner*—Fred F. Tzeng
(74) *Attorney, Agent, or Firm*—Thomas R. Berthold

(57) ABSTRACT

A magnetic recording disk drive has a patterned magnetic recording disk with data blocks of magnetizable material separated by nonmagnetic regions, a write-clock-generation circuit for timing write pulses to the write head, and a rotational vibration sensor that adjusts the timing of the write pulses to correct for errors caused by rotational disturbances to the disk drive. The write-clock-generation circuit receives a reference clock signal synchronized to disk rotation and multiplies it to generate a higher-frequency write-clock signal. The write-clock-generation circuit includes a phase detector that compares the phase of the reference clock signal and the write-clock signal and provides an error signal. The output of the rotational vibration sensor is summed with the phase detector error signal to compensate for disk rotation speed changes caused by rotational disturbances.

13 Claims, 4 Drawing Sheets

MAGNETIC RECORDING DISK DRIVE WITH PATTERNED MEDIA AND COMPENSATION FOR WRITE-CLOCK TIMING ERROR CAUSED BY ROTATIONAL DISTURBANCES

BACKGROUND OF THE INVENTION

1. Field of the Invention

This invention relates generally to magnetic recording disk drives for use with patterned media, wherein each data bit is stored in a magnetically isolated block on the disk, and more particularly to such a disk drive with an improved clock for writing the data.

2. Description of the Related Art

Magnetic recording hard disk drives with patterned magnetic recording media have been proposed to increase the data density. In patterned media, the magnetic material on the disk is patterned into small isolated blocks or islands such that there is a single magnetic domain in each island or "bit". The single magnetic domains can be a single grain or consist of a few strongly coupled grains that switch magnetic states in concert as a single magnetic volume. This is in contrast to conventional continuous media wherein a single "bit" may have multiple magnetic domains separated by domain walls. To produce the required magnetic isolation of the patterned blocks, the magnetic moment of the regions between the blocks must be destroyed or substantially reduced so as to render these regions essentially nonmagnetic. Alternatively, the media may be fabricated so that that there is no magnetic material in the regions between the blocks. U.S. Pat. No. 5,820,769 is representative of various types of patterned media and their methods of fabrication. A description of magnetic recording systems with patterned media and their associated challenges is presented by R. L. White et al., "Patterned Media: A Viable Route to 50 Gbit/in$^2$ and Up for Magnetic Recording?", *IEEE Transactions on Magnetics*, Vol. 33, No. 1, January 1997, pp. 990–995.

Disk drives typically use a rotary voice-coil-motor (VCM) actuator for positioning the read/write heads. A servo control system receives servo positioning information read by the read/write heads from the data tracks, typically from equally-angularly-spaced servo sectors that extend generally radially across the tracks. The servo control system generates control signals to the VCM to maintain the read/write heads on track and move them to the desired tracks for reading and writing of data. The servo sectors also contain servo timing marks (STMs) that indicate the start of the servo sectors. The STMs are often used as a reference clock signal for the write clock which controls the timing of the write pulses from the disk drive write head.

To assure that the disk drive write head magnetizes the blocks on the patterned media, the media must be patterned perfectly with a single accurate period, and the effective motor speed of the spindle supporting the disks must be highly stable so that the write clock is perfectly synchronized with the blocks as they pass beneath the write head. While the STMs are often used as the reference clock input to the write clock, U.S. Pat. No. 6,754,017 B2, assigned to the same assignee as this application, describes a magnetic recording disk drive with patterned media that uses a special pattern-sensor that senses the data blocks before they pass beneath the write head and generates a write-clock signal.

Disk drives experience rotational vibration and disturbance forces during normal operation. These disturbances arise internally, such as from motion of the VCM actuator, as well as externally, such as from shocks to the frame supporting the disk drive or from the movement of other disk drives when the drives are mounted together in a disk array system. These disturbances affect the spindle motor speed, causing small speed variations or "jitter", which in turn affects the timing of the reference clock input. The spindle motor jitter is especially problematic in patterned media drives because of the requirement of precise timing of the write pulses to the patterned data blocks.

What is needed is a magnetic recording disk drive with patterned media that has an accurate write-clock signal that is not significantly affected by rotational disturbances so that the data can be accurately written to the patterned data blocks.

SUMMARY OF THE INVENTION

The invention is a magnetic recording disk drive that has a patterned magnetic recording disk with data blocks of magnetizable material separated by nonmagnetic regions, a write-clock-generation circuit for timing write pulses to the write head, and a rotational vibration sensor that adjusts the timing of the write pulses to correct for errors caused by rotational disturbances to the disk drive. The write-clock-generation circuit may be a phase-locked-loop (PLL) circuit with a voltage-controlled-oscillator (VCO) that receives a reference clock signal synchronized to disk rotation and multiplies it to generate a higher-frequency write-clock signal. The reference clock signal may be provided by servo sector timing marks (STMs) that indicate the start of equally-angularly-spaced servo sectors in the concentric data tracks on the disk. The PLL circuit includes a phase detector that compares the phase of the reference clock signal and the VCO output and provides an error signal to the VCO. The output of the rotational vibration sensor is summed with the phase detector error signal to compensate for disk rotation speed changes caused by rotational disturbances.

The rotational vibration sensor may be a rotational accelerometer, which may be two linear accelerometers, each of which is attached to the disk drive near a respective side of the disk drive base. The outputs of the two linear accelerometers are differentially sensed and filtered to provide an angular acceleration signal summed with the error signal to the VCO. The rotational accelerometer detects disk drive disturbances that arise internally, such as from motion of the disk drive actuator, as well as externally, such as from shocks to the frame supporting the disk drive or from the movement of other disk drives when the drives are mounted together in a disk array system. These disturbances affect the speed of the spindle motor, causing small speed variations or "jitter", and thus the rotational speed of the disk. This results in errors to the reference clock signal input to the write-clock-generation circuit and thus in errors in the timing of the write-clock signal. The angular acceleration signal from the rotational accelerometer compensates for the write-clock timing error caused by the rotational disturbances.

For a fuller understanding of the nature and advantages of the present invention, reference should be made to the following detailed description taken together with the accompanying figures.

DETAILED DESCRIPTION OF THE INVENTION

Figure 1:
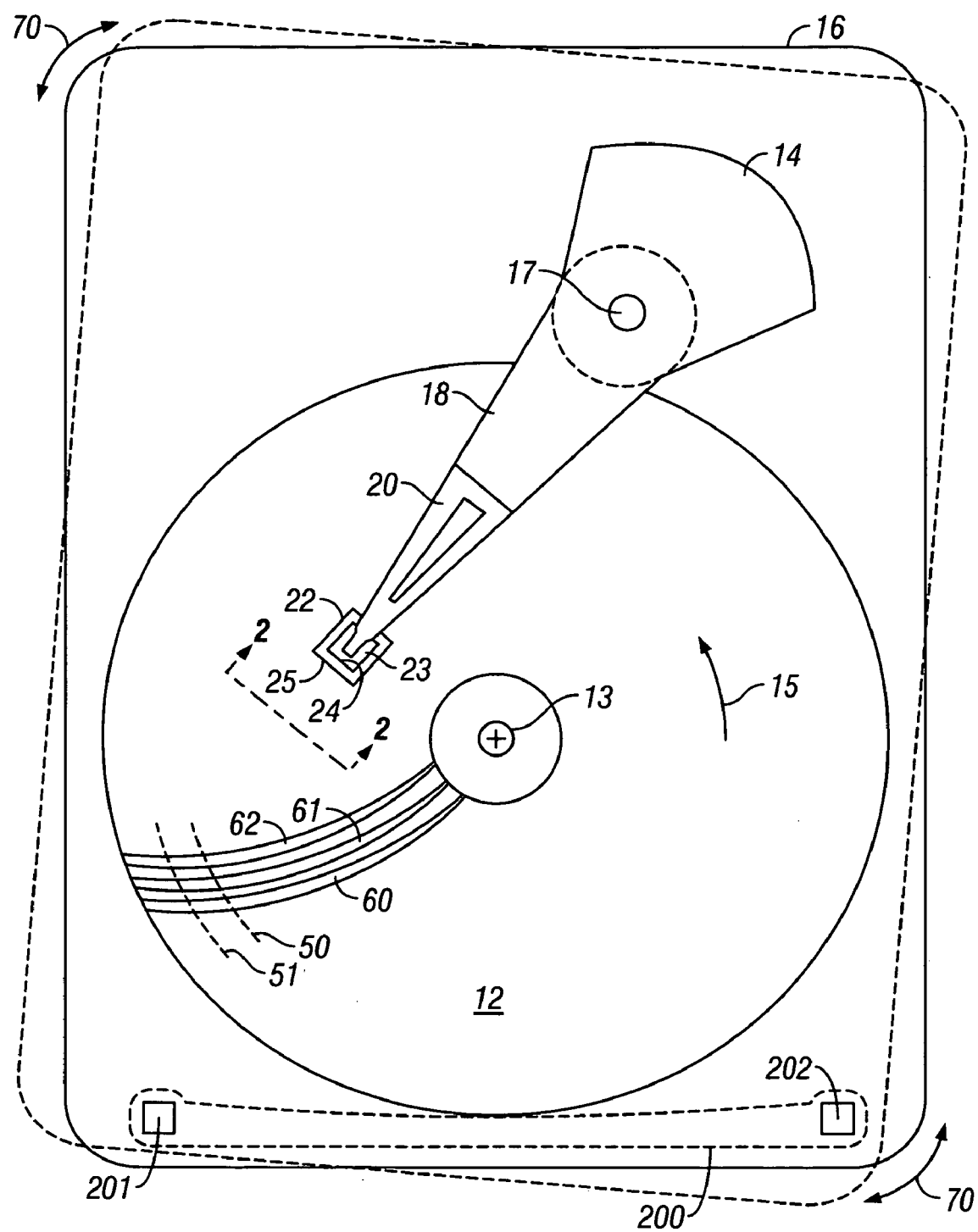
FIG. 1 is a schematic top view of a magnetic recording hard disk drive according to the present invention with the cover removed.

FIG. 1 is a block diagram of a magnetic recording hard disk drive according to the present invention. The disk drive includes a magnetic recording disk 12 that is rotated about an axis of rotation 13 in direction 15 by a spindle motor (not shown) mounted to the disk drive housing or base 16. The disk 12 has a magnetic recording layer patterned into magnetizable blocks that define concentric data tracks, such as typical tracks 50, 51, and servo sectors, such as typical servo sectors 60, 61, 62. The servo sectors extend generally radially across the concentric data tracks so that each data track has a plurality of equally-angularly spaced servo sectors that extend around the track. Each of the servo sectors in a data track contains a servo timing mark (STM), also called a servo address mark (SAM), that indicates the start of the servo sector, and servo positioning information.

The disk drive also includes a rotary voice coil motor (VCM) actuator 14 supported on the base 16. The actuator 14 pivots about axis 17 and includes a rigid actuator arm 18. A generally flexible suspension 20 includes a flexure element 23 and is attached to the end of arm 18. A head carrier or air-bearing slider 22 is attached to the flexure 23. A magnetic recording read/write head 24 is formed on the trailing surface 25 of slider 22. The flexure 23 and suspension 20 enable the slider to "pitch" and "roll" on an air-bearing generated by the rotating disk 12.

As the disk 12 rotates in the direction 15, the read head reads the positioning information in the servo sectors to control the VCM to move the read/write head 24 to the desired data track and maintain it on track for reading and writing of data. The read head also detects the STMs, which are used as a reference clock signal to control the timing of the write clock so that the write head generates write pulses precisely timed with the blocks of magnetizable material in the patterned recording layer of disk 12. The disk drive also includes a rotational vibration sensor 200 that detects disturbances that cause rotational movement of the disk drive, as shown by arrows 70. The rotational vibration sensor 200 is preferably a rotational accelerometer, shown as two linear accelerometers 201, 202, attached to the base 16. Each accelerometer 201, 202 is located near a respective side of base 16. The accelerometer is shown schematically as being attached directly to the base 16, but in the preferred embodiment it is attached to a printed circuit board or card (not shown) that contains the disk drive electronics, which is secured to the base 16. These disturbances arise internally, such as from motion of the VCM, as well as externally, such as from shocks to the frame supporting the disk drive or from the movement of other disk drives when the drives are mounted together in a disk array system. These disturbances affect the spindle motor speed, causing small speed variations or "jitter". The spindle motor jitter affects the timing of the STMs detected by the read head and thus the timing of the write clock. In this invention the rotational accelerometer 200 is used to compensate for the write-clock timing error caused by rotational disturbances, in the manner to be explained below.

Figure 2:
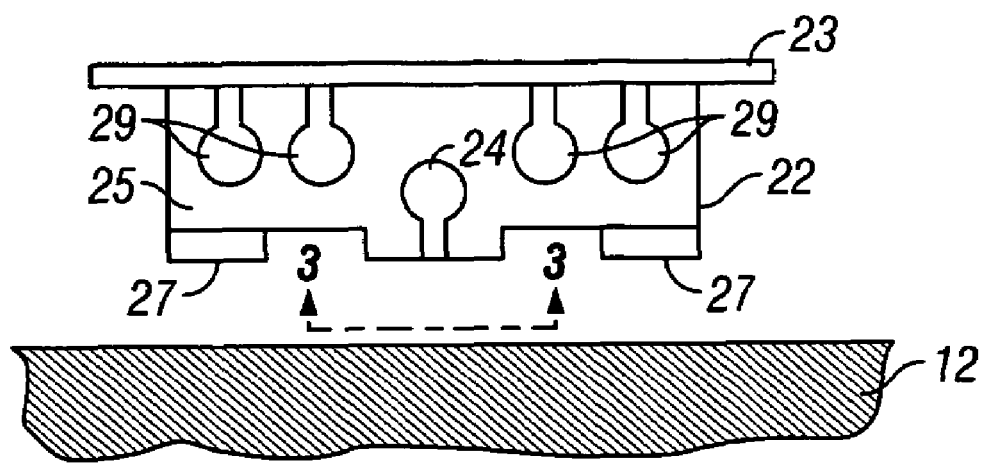
FIG. 2 is an enlarged end view of the slider and a section of the disk taken in the direction 2—2 in FIG. 1.

FIG. 2 is an enlarged end view of the slider 22 and a section of the disk 12 taken in the direction 2—2 in FIG. 1. The slider 22 is attached to flexure 23 and has an air-bearing surface (ABS) 27 facing the disk 12 and a trailing surface 25 generally perpendicular to the ABS. The ABS 27 causes the airflow from the rotating disk 12 to generate a bearing of air that supports the slider 22 in very close proximity to or near contact with the surface of disk 12. The read/write head 24 is formed on the trailing surface 25 and is connected to the disk drive read/write electronics by electrical connection to terminal pads 29 on the trailing surface 25.

Figure 3:
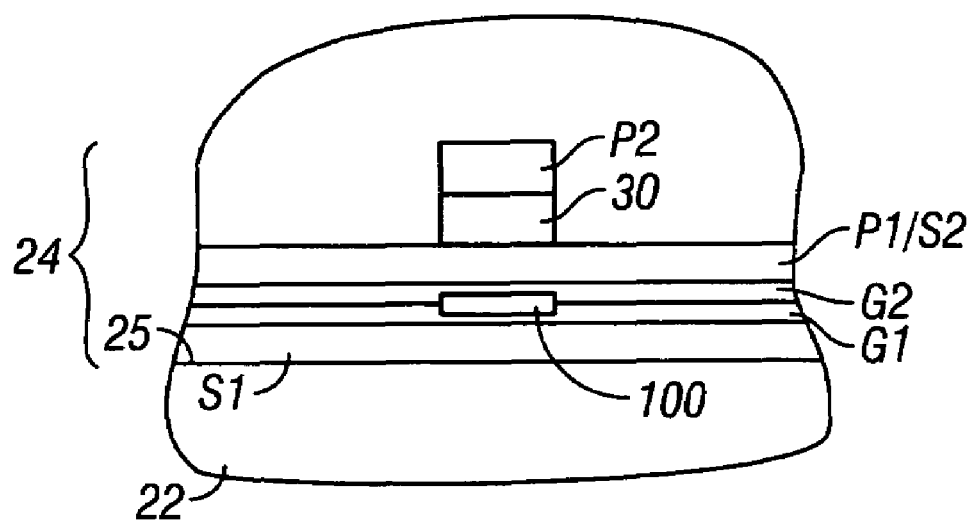
FIG. 3 is a view in the direction 3—3 of FIG. 2 and shows the ends of the read/write head as viewed from the disk.

FIG. 3 is a view in the direction 3—3 of FIG. 2 and shows the ends of read/write head 24 as viewed from the disk 12. The read/write head 24 is a series of thin films deposited and lithographically patterned on the trailing surface 25 of slider 22. The inductive write head includes magnetic write poles P1/S2 and P1 separated by a write gap 30. The read head 100, typically a magnetoresistive sensor, is located between two insulating gap layers G1, G2. Gap layers G1, G2 are located between magnetic shields S1 and P1/S2, with P1/S2 also serving as the first write pole for the write head.

Figure 4:
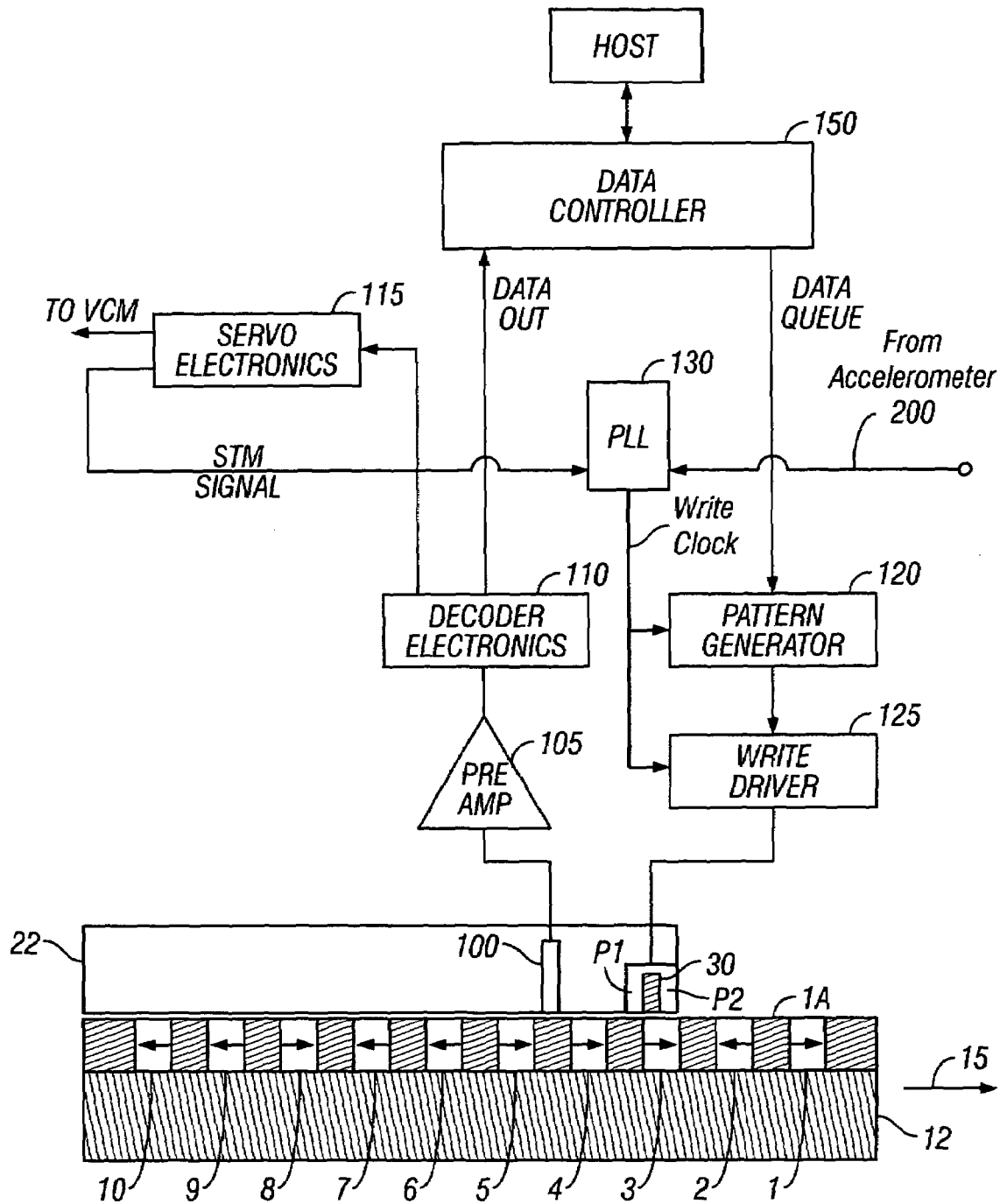
FIG. 4 is a sectional view of the magnetic recording disk with a patterned magnetic recording layer and shows the read and write heads connected to the data controller for the transfer of data to and from the host system.

FIG. 4 shows a sectional view of the magnetic recording disk 12 with a magnetic recording layer of patterned media in the form of discrete blocks 1–10 of magnetic material. The air-bearing slider 22 is depicted in sectional view above disk 12 and is shown with the read head 100 and the write head formed of poles P1, P2 and write gap 30. The blocks 1–10 in FIG. 4 are magnetizable regions of magnetic material on the disk 12 and are aligned along a data track and are spaced apart by nonmagnetic regions, such as region 1A between blocks 1 and 2. The term "nonmagnetic" means that the regions between the data blocks are formed of a non-ferromagnetic material, such as a dielectric, or a material that has no substantially remanent moment in the absence of an applied magnetic field. The nonmagnetic regions may also be the absence of magnetic material, such as grooves or troughs in the magnetic recording layer or disk substrate. The arrows depicted in the blocks 1–10 represent the magnetic moments or magnetization directions in the blocks, and are depicted for horizontal or in-plane magnetic recording. In a disk drive the data tracks are circular and concentric. As shown in FIG. 4, the blocks are illustrated as being evenly spaced along the track but in reality they would be somewhat unevenly spaced along the data track because of imperfect patterning that can occur during fabrication. While it is common to refer to each block as storing a data "bit", it is actually the transition between the magnetization directions in successive data blocks that represent a data bit in the data channel of the disk drive. The recording or writing of data occurs by the conventional thin film inductive coil write head that has write poles P1, P2 that generate a magnetic field across the write gap 30 to magnetize the blocks in one of the two magnetization directions, depending on the direction of current through the coil of the write head. Because there is no magnetic material between the blocks 1–10, the write pulses must be precisely timed to magnetize the appropriate blocks. While FIG. 4 illustrates horizontal or longitudinal patterned media, wherein the blocks 1–10 are depicted with their moments in the plane of the recording layer, the invention is fully applicable to perpendicular patterned media, wherein the blocks 1–10 would be formed of material with perpendicular magnetic anisotropy, and have their moments oriented into and out of the plane of the magnetic recording layer.

FIG. 4 also shows schematically the transfer of data between a host system, such as a PC, and the disk drive. The signals from recorded data and servo sectors in the data tracks of disk 12 are detected by read head 100, amplified by pre-amplifier 105 and sent to decoder electronics 110. Decoder electronics 110 sends the data to data controller 150 and servo information to servo electronics 115. Servo electronics 115 decodes the servo information and generates control signals to the VCM 14. The servo electronics 115 also includes a STM decoder that generates the STM signal that serves as the reference clock signal. The data to be written to the disk 12 is sent from the host to the data controller 150 and then as a data queue to pattern generator 120 and then to write driver 125. The write driver 125 generates high-frequency current pulses to the coil of the thin film inductive write head 30 which results in the magnetic write fields that magnetize the data blocks 1–10 on disk 12. A write-clock-generation circuit, such as phase-locked loop (PLL) 130, receives the STM signal as a reference clock signal and generates a write-clock signal for timing the pattern generator 120 and write driver 125. A PLL circuit is a common write-clock-generation circuit and multiplies the reference clock signal to generate a higher frequency write-clock signal. Because the reference clock signal (the STM signal in FIG. 4) is synchronized with disk rotation, the write-clock signal reflects variations in disk rotational speed. In this invention, as shown in FIG. 4, the PLL also receives an input from the rotational accelerometer (linear accelerometers 201, 202 as shown in FIG. 1) to compensate for rotational disturbances that can affect the timing of the STM signal and thus the timing of the write clock 125.

Because the magnetizable data blocks are precisely located on the disk it is necessary to precisely control the spindle motor speed and to adjust the write-clock timing due to the timing jitter of the blocks. The spindle motor bandwidth is limited by the number of poles and slots and the jitter cannot be measured during writing of data. The jitter can only be measured in the time intervals between STMs if the STMs are used to provide the reference clock signal. Since the bandwidth of the write-clock PLL is limited by the number of STMs received in one disk rotation, high-frequency rotational disturbances cannot be suppressed by the write-clock PLL.

Figure 5:
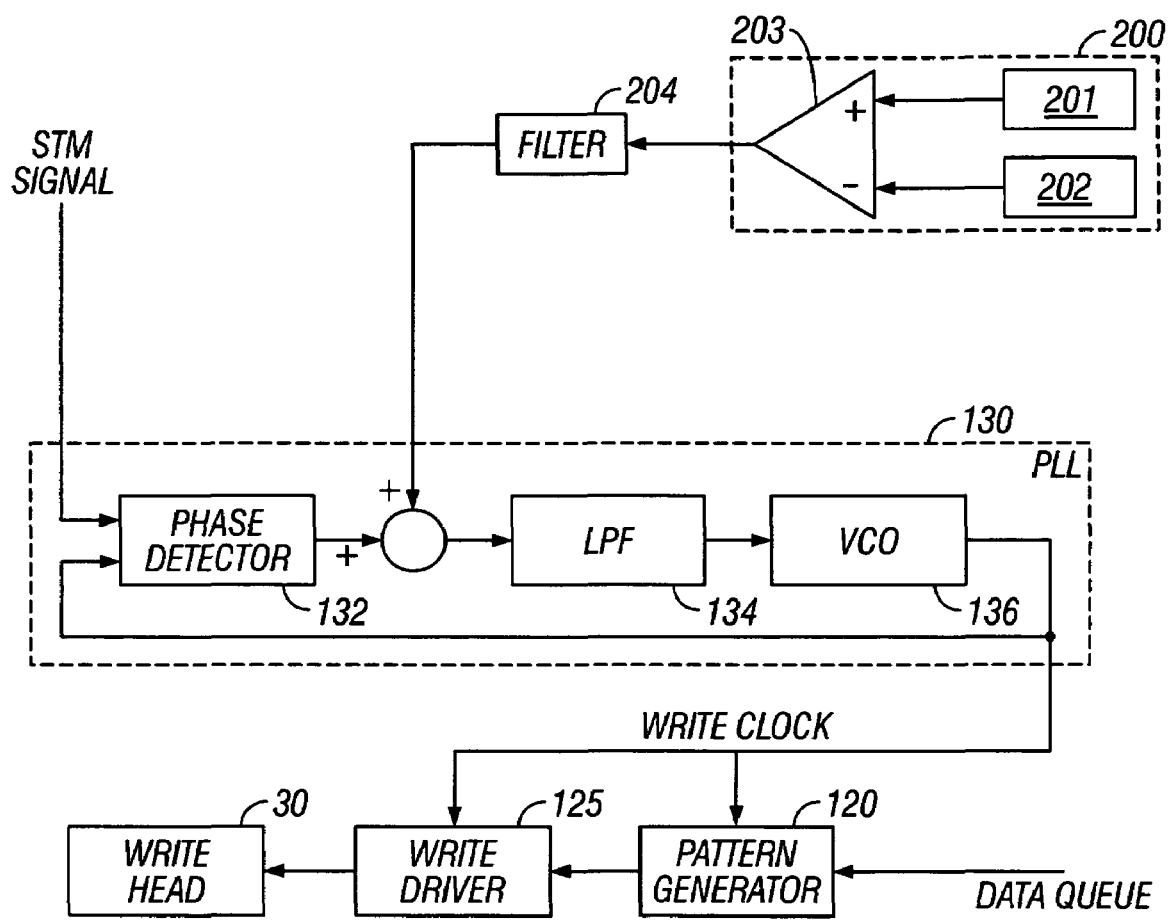
FIG. 5 is a block diagram of the write-clock-generation circuit according to the present invention.

FIG. 5 is a schematic showing the compensation for the spindle motor timing jitter by using the rotational acceleration sensor. The PLL 130 includes an error (phase) detector 132 that receives the incoming STM signal as the reference clock, a low pass filter (LPF) 134, a voltage controlled oscillator (VCO) 136 that outputs the write-clock signal, and a feedback circuit, such as a divider circuit, for directing the output from VCO 136 back to an input to the phase detector 132 for comparison against the STM signal. The VCO generates a write-clock signal having a predetermined number of cycles for each pulse of the reference clock signal. If the phase relationship between the STM signal and the VCO output changes, the phase detector 132 provides an error signal indicative of the direction and the magnitude of the change. The output of the VCO is then adjusted in response to the error signal after filtering by LPF 134 to drive the error signal to zero to lock the VCO write-clock signal to the incoming STM signal. The VCO write-clock signal serves as the timing signal for the pattern generator 120 and write driver 125.

As shown in FIG. 5, in the present invention the write-clock timing error of VCO 136 is also compensated by an additional angular acceleration signal that is summed with the output of phase detector 134. The difference in output of the two linear accelerometers 201, 202 is summed at differential amplifier 203, so that together the linear accelerometers and the differential amplifier 203 function as the rotational accelerometer 200. The linear accelerometers 201, 202 may be commercially available two-axis piezoelectric accelerometers, such as Murata Model PKGS-00MD. The output of differential amplifier 203 is input to a gain and phase compensation filter 204 that eliminates noise and matches the gain and phase of the spindle motor response and the accelerometer 200 response to the rotational disturbance. This type of rotational or angular accelerometer 200 is described for use in adjusting track misregistration (TMR) of a read/write head in a hard disk drive by Jinzenji et al., "Acceleration Feedforward Control Against Rotational Disturbance in hard Disk Drives", *IEEE Transactions on Magnetics*, Vol. 37, No. 2, March 2001, pp. 888–893. The angular accelerometer may also be a single-piece angular accelerometer. A single-piece angular accelerometer with two differentially-sensed cantilever beams is described for use in adjusting track misregistration (TMR) of a read/write head in a hard disk drive by D. Y. Abramovitch, "Rejecting Rotational Disturbances On Small Disk Drives Using Rotational Accelerometers", *Proceedings of the 1996 IFAC World Congress in San Francisco*, 1996, pp. 1–8. Other types of rotational accelerometers are commercially available from STMicroelectronics and Delphi.

The invention has been described above wherein the STM signal is used as the reference clock signal to the PLL (FIG. 5). However, the invention is fully applicable to disk drives that use other techniques for generating the reference clock signal, such as separate disk rotation sensors and spindle motor rotation sensors that are responsive to disk rotation. Also, in the previously cited U.S. Pat. No. 6,754,017 B2 that describes a special pattern-sensor to detect the blocks on a patterned-media disk as the disk rotates, the pattern-sensor can provide a reference clock signal. U.S. Pat. No. 5,535,067 describes other techniques for generating the reference clock signal.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A magnetic recording disk drive comprising:
    a base;
    a spindle motor on the base;
    a magnetic recording disk rotatable by the spindle motor and having a recording layer of magnetizable material, the recording layer having a plurality of generally circular data tracks, each data track patterned into discrete data blocks of magnetizable material separated by nonmagnetic regions;
    a write head for magnetizing the data blocks;
    a write driver coupled to the write head for generating write pulses to the write head;
    a reference clock responsive to disk rotation for generating a reference clock signal;
    a phase-locked-loop (PLL) write-clock-generation circuit responsive to the reference clock signal and coupled to the write driver for controlling the timing of write pulses generated by the write driver, said circuit comprising a phase detector, a low-pass filter (LPF) and a voltage-controlled oscillator (VCO), the VCO output and the reference clock signal being input to the phase detector; and a rotational vibration sensor attached to the base, the vibration sensor output being summed with the phase detector output to provide a timing adjustment signal to the VCO.

2. The disk drive of claim 1 wherein each data track has generally equally-angularly spaced servo timing marks (STMs), and further comprising a read head for detecting the STMs and a STM decoder for generating a reference clock signal from the STMs, the STM decoder being the reference clock.

3. The disk drive of claim 1 wherein the reference clock comprises a pattern-sensor for detecting the presence of data blocks.

4. The disk drive of claim 1 wherein the rotational vibration sensor comprises a rotational accelerometer.

5. The disk drive of claim 4 wherein the rotational accelerometer comprises two linear accelerometers each providing an output, and a differential amplifier providing an output representing the difference of the two linear accelerometer outputs, each linear accelerometer being attached near a respective side of the base.

6. The disk drive of claim 4 further comprising a phase and gain compensation filter coupled between the rotational accelerometer and the write-clock-generation circuit.

7. The disk drive of claim 1 further comprising a pattern generator for generating a pattern of write signals to the write driver and wherein the output of the write-clock-generation circuit is input to the pattern generator.

8. The disk drive of claim 1 wherein the magnetized data blocks are magnetized in a direction substantially parallel to the disk.

9. The disk drive of claim 1 wherein the magnetized data blocks are magnetized in a direction substantially perpendicular to the disk.

10. A magnetic recording disk drive comprising:

a base;

a spindle motor on the base;

a magnetic recording disk rotatable by the spindle motor and having a recording layer of magnetizable material, the recording layer having a plurality of generally circular data tracks, each data track patterned into discrete data blocks of magnetizable material separated by nonmagnetic regions and each data track having generally equally-angularly spaced servo timing marks (STMs);

a read head for generating a readback signal from magnetized data blocks in a data track and for generating a STM signal from the STMs;

a write head for magnetizing the data blocks;

a write driver coupled to the write head for generating write pulses to the write head;

a pattern generator for generating a pattern of write signals to the write driver;

a write clock responsive to STMs detected by the read head and coupled to the pattern generator and the write driver for clocking the write signals to the write driver; and a rotational accelerometer comprising a differential amplifier and two linear accelerometers, each linear accelerometer attached near a respective side of the base and providing an output to the differential amplifier, the differential amplifier generating a timing adjustment signal to the write clock.

11. The disk drive of claim 10 further comprising a phase and gain compensation filter coupled between the rotational accelerometer and the write clock.

12. The disk drive of claim 10 further comprising a phase-locked-loop (PLL) circuit comprising a phase detector, a low-pass filter (LPF) and a voltage-controlled oscillator (VCO), wherein the write clock is the VCO, wherein the VCO output and the STM signal are inputs to the phase detector, and wherein the output of the phase detector is summed with the differential amplifier output to provide the timing adjustment signal.

13. A magnetic recording disk drive comprising:

a base;

a spindle motor on the base;

a magnetic recording disk rotatable by the spindle motor and having a recording layer of magnetizable material, the recording layer having a plurality of generally circular data tracks, each data track patterned into discrete data blocks of magnetizable material separated by nonmagnetic regions;

a write head for magnetizing the data blocks;

a write driver coupled to the write head for generating write pulses to the write head;

a reference clock responsive to disk rotation for generating a reference clock signal;

a write-clock-generation circuit responsive to the reference clock signal and coupled to the write driver for controlling the timing of write pulses generated by the write driver; and a rotational vibration sensor comprising a differential amplifier and two linear accelerometers, each linear accelerometer attached near a respective side of the base and providing an output to the differential amplifier, the differential amplifier generating a timing adjustment signal to the write-clock-generation circuit.

* * * * *